(12) United States Patent
Flint et al.

(10) Patent No.: US 7,822,576 B2
(45) Date of Patent: Oct. 26, 2010

(54) ENGINE HEALTH MONITORING

(75) Inventors: Paul A Flint, Derby (GB); Sylvain Brillat, Montcarra (FR)

(73) Assignee: Rolls-Royce plc, London (GB)

( * ) Notice: Subject to any disclaimer, the term of this patent is extended or adjusted under 35 U.S.C. 154(b) by 961 days.

(21) Appl. No.: 11/633,525

(22) Filed: Dec. 5, 2006

(65) Prior Publication Data
US 2007/0261384 A1 Nov. 15, 2007

(30) Foreign Application Priority Data
Dec. 16, 2005 (GB) .................................. 0525573.2

(51) Int. Cl.
G06F 11/30 (2006.01)
G21C 17/00 (2006.01)

(52) U.S. Cl. ............................ 702/182; 60/772; 60/776; 60/779; 60/39.281; 701/29; 701/30; 701/31; 701/32; 701/33; 701/34; 701/35; 702/183; 702/184; 702/185

(58) Field of Classification Search ................... 60/772, 60/776, 779; 701/29–35; 702/182–185
See application file for complete search history.

(56) References Cited

U.S. PATENT DOCUMENTS 4,512,722 A    4/1985  Mouton
7,246,024 B2 *  7/2007  Muramatsu et al. ......... 702/116
7,431,569 B2 * 10/2008  Griffiths ....................... 417/53

FOREIGN PATENT DOCUMENTS

| EP | 1 154 137 A | 12/2003 |
| EP | 1 522 731 A | 4/2005 |
| EP | 1 505 279 A | 11/2005 |

* cited by examiner

*Primary Examiner*—Michael Cuff
*Assistant Examiner*—Craig Kim
(74) *Attorney, Agent, or Firm*—Jeffrey S. Melcher; Manelli Denison & Selter PLLC

(57) ABSTRACT

A method of monitoring the health of a gas turbine engine 10 comprising a fuel system 30 having a fuel metering valve 36 and a fuel pump 40 for supplying fuel to a combustor apparatus 15. The method comprising the steps of: monitoring the fuel metering valve percentage open, detecting and sending a warning message when the fuel metering valve percentage open is at 97% or greater and within a predetermined time from when the first percentage open is at 97% or greater, replacing the fuel pump 40. In this way scheduling of servicing and replacement of the fuel pump may be made without disruption to the aircraft operator particularly where the operator has a fleet of aircraft.

6 Claims, 3 Drawing Sheets

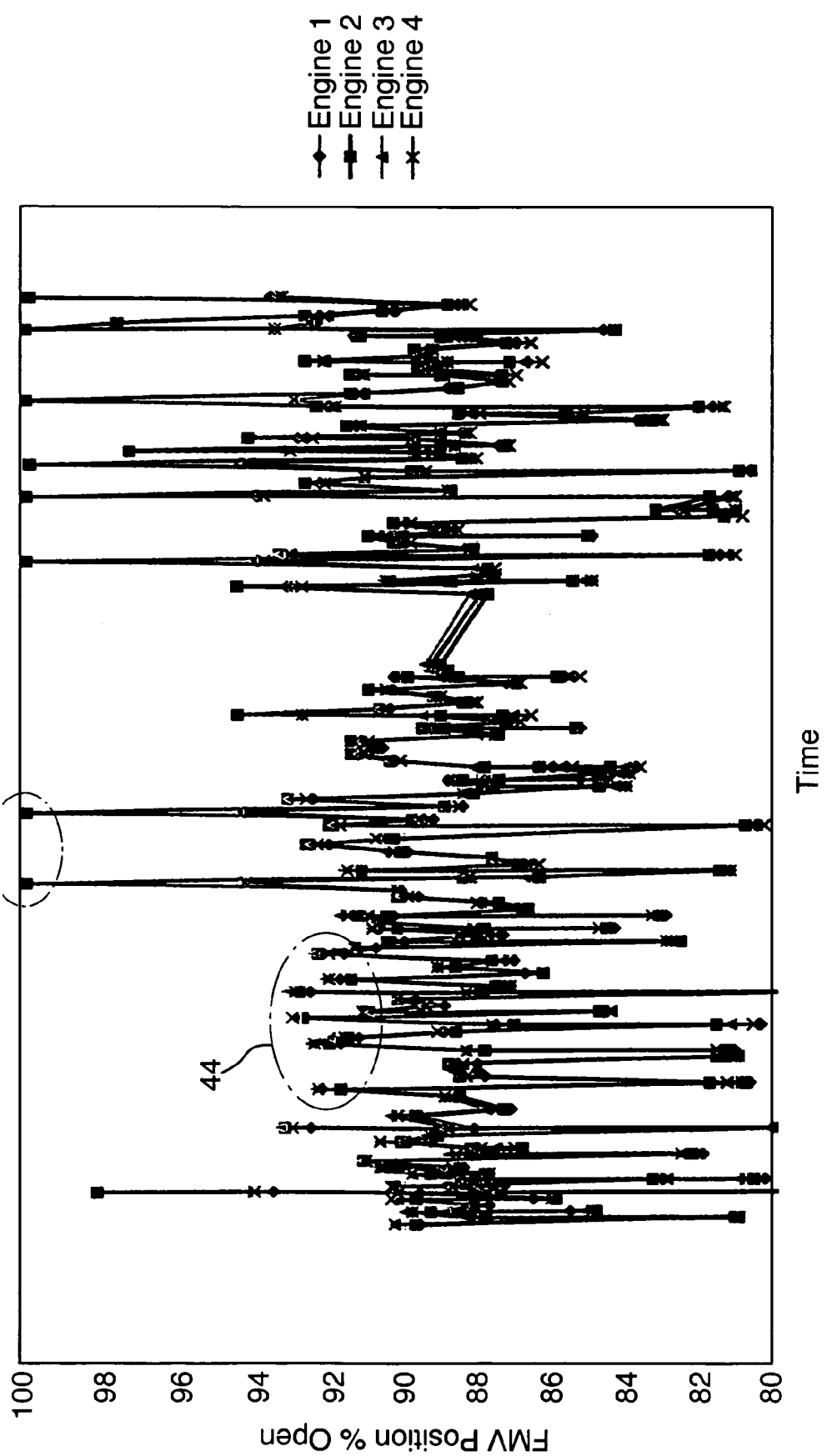

ENGINE HEALTH MONITORING

CROSS-REFERENCE TO RELATED APPLICATIONS

This application claims priority to GB 0525573.2, filed 16 Dec. 2005.

BACKGROUND OF THE INVENTION

This invention relates to health monitoring of gas turbine engines.

Conventional gas turbine engines use a fuel pump to deliver fuel to their combustion systems. In certain circumstances the fuel pump is susceptible to cavitation erosion during normal service operation. In some cases this can lead to loss of fuel pump performance and subsequent service disruption to the customer.

Currently, during engine shutdown the Engine Electronic Controller (EEC) records and sends a warning message when insufficient fuel pressure is available to drive the Hydro Mechanical Unit (HMU) dump valve. However, the prime function of this EEC message is to monitor the operation of the HMU dump valve and not to indicate poor fuel pump performance.

This conventional method only indirectly identifies loss of fuel pump performance i.e. when the operation of the HMU dump valve is compromised. Thus a major disadvantage of this conventional method is that there is no warning of imminent failure of the fuel pump. This has a serious implication in that an aircraft mission may be aborted due to failure of the fuel pump. Furthermore, this will necessitate an immediate and time-consuming replacement fuel pump and delays.

Further to this, the conventional method is not output as a parameter within the aircraft/engine health monitoring system. This does not allow monitoring of the reduction in HP fuel pump performance to be carried out prior to a failure warning message being set.

A further disadvantage is that a fleet of aircraft/engines does not allow fleet management and prioritised unit repair/removal to be carried out.

SUMMARY OF THE INVENTION

Thus the object of the present invention is therefore to provide an indication of non-operability of a gas turbine engine prior to a fuel pump problem occurring. A further object of the present invention is to enable fleet management and prioritisation of potential problems and their repair.

According to the invention, there is provided a method of monitoring the health of a gas turbine engine comprising a fuel system having a fuel metering valve and a fuel pump for supplying fuel to combustor apparatus, the method comprising the steps of; monitoring the fuel metering valve percentage open, detecting and sending a warning message when the fuel metering valve percentage open is at 97% or greater and within a predetermined time from when the first percentage open is at 97% or greater, replacing the fuel pump.

The predetermined time is less than 20 days, and preferably less than 10 days.

BRIEF DESCRIPTION OF THE DRAWINGS

Embodiments of the invention will now be described by way of example only, with reference to the accompanying diagrammatic drawings, in which:

FIG. 3 is a graph showing the fuel metering position maximum percentage open per flight against time

DETAILED DESCRIPTION OF THE INVENTION

Figure 1:
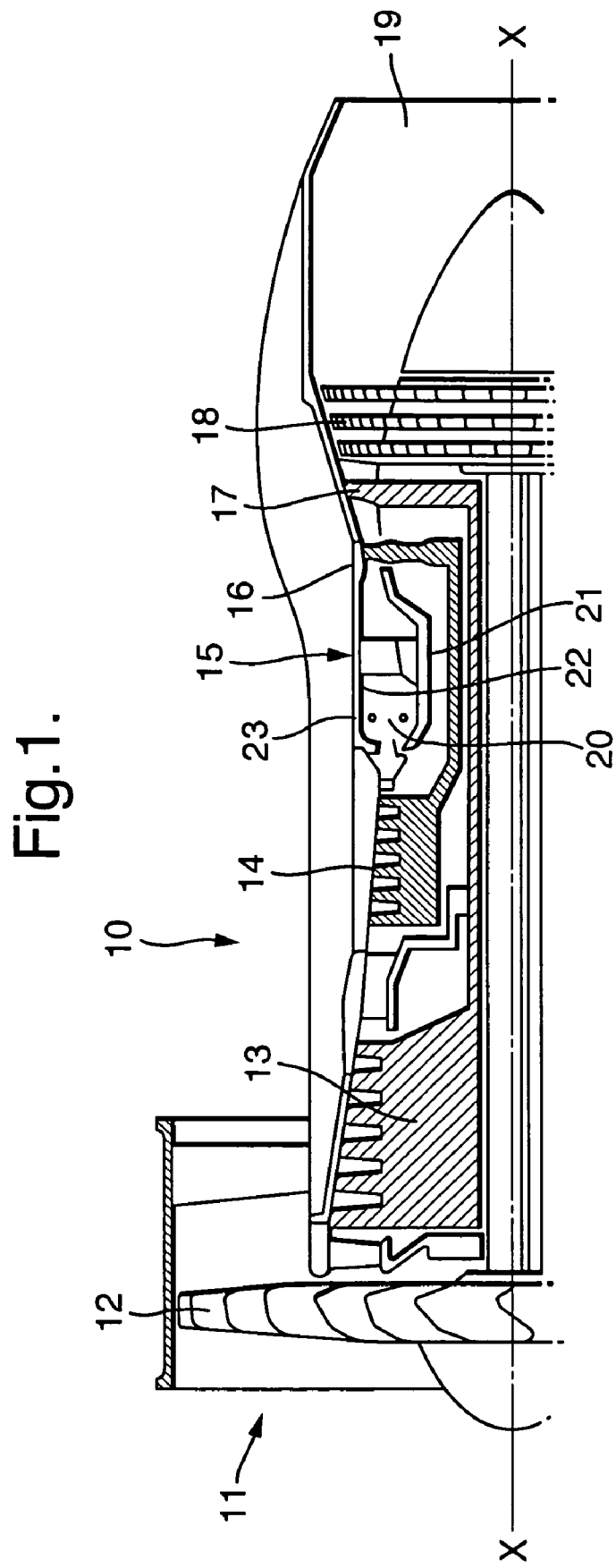
FIG. 1 is a sectional side view of a gas turbine engine.

With reference to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbine 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
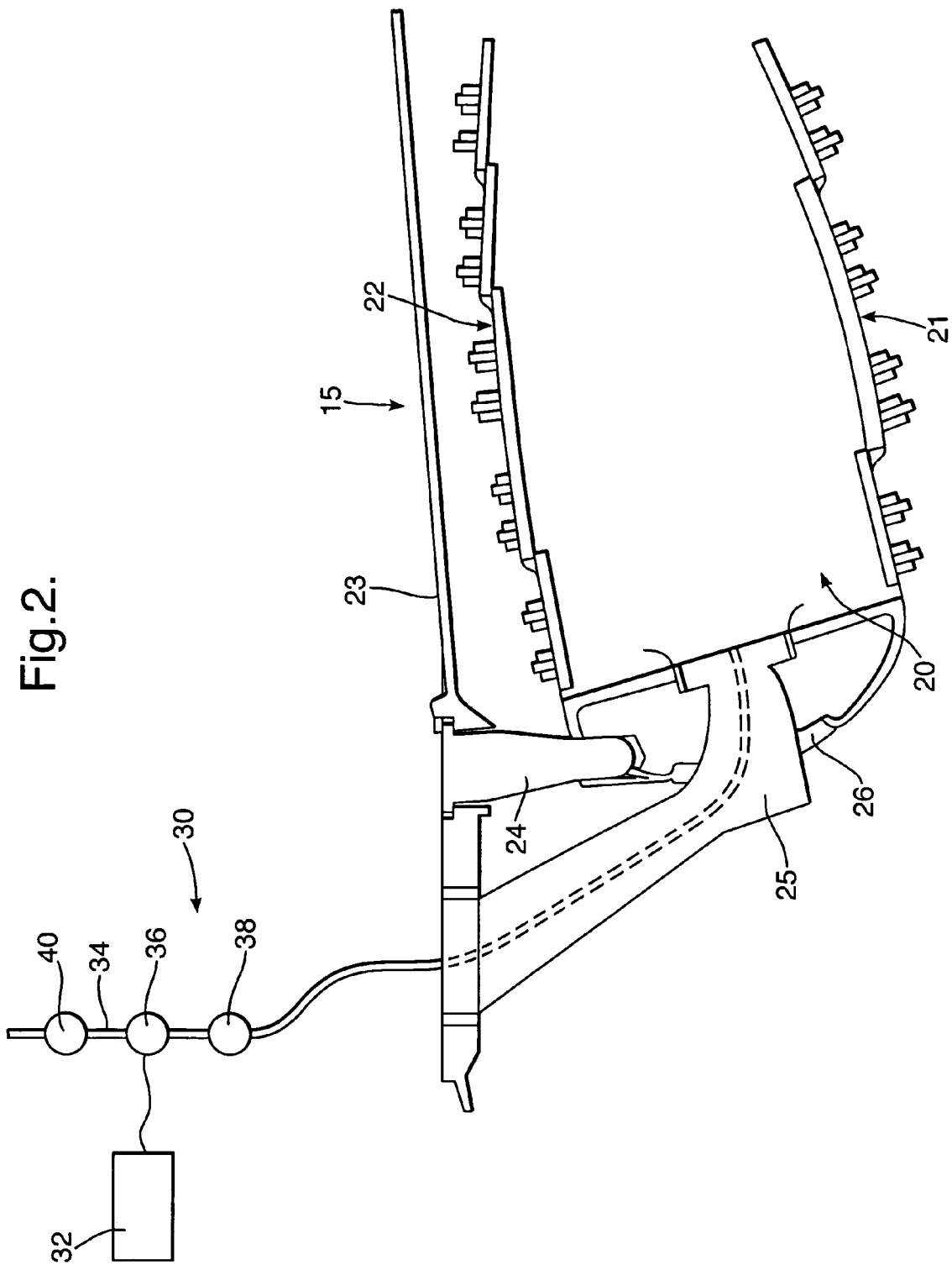
FIG. 2 is a sectional side view of part of a combustor of the engine shown in FIG. 1 and incorporating a fuel system in accordance with the present invention.

Referring to FIG. 2, the combustor 15 is constituted by an annular combustion chamber 20 having radially inner and outer double wall structures 21 and 22 respectively. The combustor 15 is secured to a wall 23 by a plurality of pins 24 (only one of which is shown). Fuel is directed into the chamber 20 through a number of fuel nozzles 25 located at the upstream end 26 of the chamber 20. The fuel nozzles are circumferentially spaced around the engine 10 and serve to spray fuel into air derived from the high pressure compressor 14. The resultant fuel/air mixture is then combusted within the chamber 20.

The fuel is delivered to the fuel nozzles 25 via a fuel system 30. The fuel system 30 comprises a fuel tank and a fuel pump 40 and a fuel line 34, a fuel metering valve (FMV) 36 incorporating a hydraulic control valve solenoid and a fuel filter 38. An Engine Electronic Controller (EEC) 32 monitors and controls the engine's functioning and in particular the fuel flow requirements via the pump 40 and metering valve 36. The EEC 32 regulates the fuel pump 40 capacity and the position of the solenoid 36, so as to vary the fuel flow according to demand, by applying a current thereto.

Experimental work has shown that when a fuel pump suffers severe cavitation erosion, its ability to deliver the fuel flow required to achieve the target engine power requirement (EPR) can become marginal and in exceptional circumstances not be met.

Referring now to FIG. 3, the method of the present invention includes monitoring the FMV position during aircraft take-off. Typically, a gas turbine engine's fuel flow requirements are greatest during take-off. By monitoring the FMV position it is possible to see "spikes" 42 where the FMV is up to 100% open. This is not a deliberate design characteristic and this behaviour occurs when the fuel pump is becoming marginal in terms of delivering the fuel flow required to achieve the target EPR. Normal engine operational FMV position percentage open values are shown within a region 44 of FIG. 3 and are typically below 96%.

Based on statistical analysis of take-off points for FMV position percentage open, it has been defined that up to 97% open is normal service behaviour for the FMV. When a FMV records 97% open or in excess of 97% open this is considered to be outside of normal behaviour and an indication of undesirably poor performance of the fuel pump 40. It should be appreciated that there is a significant difference in fuel flow quantity between 96.5% and 97%, for example this could represent a 10% difference in the quantity of fuel flow.

Thus in summary, the present invention is a method of monitoring the health of a gas turbine engine 10 comprising a fuel system 30 having a fuel metering valve 36 and a fuel pump 40 for supplying fuel to combustor apparatus 15, the method comprising the steps of; (i) monitoring the fuel metering valve percentage open, (ii) detecting and sending a warning message when the fuel metering valve percentage open is at 97% or greater and (iii) within a predetermined time from when the first percentage open is at 97% or greater, (iv) replacing the fuel pump 40. The predetermined time is preferably less than 10 days, however, it may be up to 20 days. In this way scheduling of servicing and replacement of the fuel pump may be made without disruption to the aircraft operator particularly where the operator has a fleet of aircraft.

We claim:

1. A method of monitoring the health of a fuel pump in a gas turbine engine, said gas turbine engine comprising a fuel system having a fuel metering valve and a fuel pump for supplying fuel to a combustor apparatus, the method comprising the steps of:
    monitoring the fuel metering valve percentage open;
    detecting and sending a warning message when the fuel metering valve percentage open is at 97% or greater; and
    replacing said fuel pump within a predetermined time from when the first percentage open is at 97% or greater.

2. A method of monitoring the health of a gas turbine engine as claimed in claim 1 wherein the predetermined time is less than 20 days.

3. A method of monitoring the health of a gas turbine engine as claimed in claim 1 wherein the predetermined time is less than 10 days.

4. A method of monitoring the health of a fuel pump in a gas turbine engine comprising:
    an engine electronic controller;
    a fuel pump;
    a fuel metering valve;
    at least one fuel nozzle; and
    a fuel line fluidly connecting the pump, metering valve and at least one nozzle, the controller being connected to at least the pump and the valve, wherein the method of monitoring the health of said gas turbine engine comprising:
    monitoring the fuel metering valve percentage open using the controller;
    detecting when the fuel metering valve percentage open is at 97% or greater;
    sending a warning message when the fuel metering valve percentage open is at 97% or greater; and
    replacing the fuel pump within a predetermined time from when the first percentage open is at 97% or greater.

5. A method of monitoring the health of a gas turbine engine according to claim 4 wherein the predetermined time is less than 20 days.

6. A method of monitoring the health of a gas turbine engine according to claim 4 wherein the predetermined time is less than 10 days.

* * * * *